United States Patent [19]

Ewaldt

[11] Patent Number: 5,317,337
[45] Date of Patent: May 31, 1994

[54] PRINTING METHOD FOR DISC-SHAPED INFORMATION CARRIERS

[75] Inventor: Helmut Ewaldt, Uetze-Hänigsen, Fed. Rep. of Germany

[73] Assignee: U.S. Philips Corporation, New York, N.Y.

[21] Appl. No.: 497,831

[22] Filed: Mar. 22, 1990

Related U.S. Application Data

[63] Continuation of Ser. No. 214,703, Jul. 1, 1988, abandoned.

[30] Foreign Application Priority Data

Jul. 1, 1987 [DE]  Fed. Rep. of Germany ....... 3721651

[51] Int. Cl.⁵ .................... H04N 1/21; B41J 2/435
[52] U.S. Cl. ........................ 346/1.1; 346/108
[58] Field of Search ............ 346/1.1, 108, 140, 160, 346/107 R, 134, 136

[56] References Cited

U.S. PATENT DOCUMENTS

| | | | |
|---|---|---|---|
| 4,066,268 | 1/1978 | Borchard | 369/287 |
| 4,068,028 | 1/1978 | Samonides. | |
| 4,393,386 | 7/1983 | DiGiulio. | |
| 4,534,313 | 8/1985 | Louvel | 346/140 PD |
| 4,604,631 | 8/1986 | Kinnai et al. . | |
| 4,680,596 | 7/1987 | Logan. | |
| 4,685,702 | 8/1987 | Kazuharu | 283/81 |

FOREIGN PATENT DOCUMENTS 2535699  3/1977  Fed. Rep. of Germany.
2120821 12/1983  United Kingdom.

Primary Examiner—Mark J. Reinhart
Attorney, Agent, or Firm—Richard A. Weiss

[57] ABSTRACT

Method and apparatus for printing label information in the form of graphics and/or characters on a disc-shaped information carrier (such as a CD). The label information is prepared by a data-processing system and transferred to a printer for processing. The printer then prints the label information directly on the information carrier.

16 Claims, 2 Drawing Sheets

PRINTING METHOD FOR DISC-SHAPED INFORMATION CARRIERS

CROSS-REFERENCE TO RELATED APPLICATION

This application is a continuation of application Ser. No. 214,703, filed on Jul. 1, 1988, and now abandoned.

BACKGROUND OF THE INVENTION

The invention relates to a printing method for providing disc-shaped information carriers with printed label information in the form of graphics and/or characters, printing being effected on at least a part of the surface area of at least one side of the information carrier.

Disc-shaped information carriers are generally provided with label information, for example, relating to the information content of the information carrier. In general, the label information comprises both characters and graphics. In the case of optically readable disc-shaped information carriers, for example Compact Discs, the label information is provided on one side of the information carrier in a broad annular area which is concentric with the center hole. In prior-art methods this label information is applied by a screen-printing or a tampon printing process. For both processes, it is necessary to produce a film and subsequently a printing block, which takes time and is expensive. Moreover, the known printing methods are not flexible. In the case of a high production rate, a rapid change-over to print different label information on different information carriers is not possible. It is substantially impossible to provide each information carrier with an individual identification.

SUMMARY OF THE INVENTION

It is the object of the invention to provide a printing method for disc-shaped information carriers of the type defined in the opening paragraph, enabling a flexible change-over to print different label information on different disc-shaped information carriers.

According to the invention, this object is achieved in that the label information is produced by means of a data-processing system which prepares the label information for processing by a printer and applies the information to the printer, and in that the printer provides the information carrier with print in conformity with the label information.

A printer is herein defined as any device suitable to apply a visible characterization to an information carrier.

A major advantage of the printing method of the invention for disc-shaped information carriers is that the label information, or at least not all the label information, no longer has to be produced by an expensive photographic method, up to and including the production of a printing block. It is now possible to prepare label information in a data-processing system, for example, using a graphic program. Such programs are known, for example, for making layouts of newspapers and magazines. These programs enable label information of the desired type and form to be produced by purely electronic means in a data-processing system. The label information can easily be modified at this stage if necessary.

The label information produced in the data-processing system and available in purely electronic form is then prepared for processing by a printer and is applied to printer. To prepare the label information, the information may be broken down into lines in the desired structure, so that it can be processed in the appropriate manner by a printer. Such programs are also known in a wide variety for printers, for example, matrix or ink-jet printers, in data-processing systems.

Some prior-art printing methods that could be used are described in, for example, the periodical "Computer Design" of January 1988, pages 43-49 (herewith incorporated by reference), such as ink-jet printing, solid-ink printing, thermal-transfer technology, dye-diffusion methods and color-laser printing.

Prior-art printing methods involving the use of data-processing techniques are described, for example, in U.S. Pat. Nos. 4,393,386; 4,604,631 and 4,680,596, (herewith incorporated by reference).

The label information which has been prepared and applied to the printer now drives the printer in order to print the label information on the information carriers.

With the method of the invention, label information can be prepared rapidly by means of a suitable program in a data processing system. Moreover, alterations can be made very rapidly both during processing and also subsequently. The data-processing system can generate different label information for disc-shaped information carriers having different information contents. For example, it is readily possible to make a file with different label information, from which the desired label information can be extracted very rapidly and printed on the information carrier by means of the printer. Thus, while printing the label information on the information carriers, the information can be changed rapidly. The method is, therefore, very flexible. Programs for processing the label information in the data-processing system, such as, for example, graphic programs and programs for preparing the information for a printer, are commercially available in a wide variety and most data-processing systems include such programs anyway.

Another advantage is that the preparation time is shorter label information can be produced and printed on a new series of disc-shaped information carriers in a substantially shorter time than with the prior-art method. Proofs, for example, can also be made in a short time. Consequently, when a new series of disc-shaped information carriers is started no time is lost in the production of the label information, such as, the production of the printing blocks etc. needed in the prior-art methods.

As a result of the very flexible method of printing different kinds of label information on disc-shaped information carriers, time and costs can be saved, in particular in the case of small series of information carriers, so that the production of very small series with a separate label now becomes economically feasible.

In an embodiment of the invention, for printing on an annular area of the information carrier, a printer head is moved radially over the annular area and the information carrier is rotated.

As stated above, the label information produced in the data-processing system is prepared for the printer by means of a suitable program. Such programs are known and provide a break-down of the information into lines which can be processed one after another by the printer. When it is required to print on an annular area of the label of a disc-shaped information carrier, it is advantageous to construct the printer or its printing mechanism in such a way that it can move radially over the annular area of the information carrier. In addition, the disc-shaped information carrier is rotated. An appropriate combination of these two movements then enables line-by-line printing on the annular printing area of the disc-shaped information carrier by means of the printer. This is done, for example, by first printing a radial line and subsequently rotating the information carrier through a specific angle, after which the next line is printed etc. The principal advantage of this is that the apparatus needed for such a printing process can be of simple construction. Another possibility is to print the label information in concentric or spiral tracks. This has the advantage of a continuous relative movement between the information carrier and the printing apparatus. The program should then be adapted accordingly.

In another embodiment of the invention, for printing on the information carrier, the information carrier and the printer head are each moved along a straight line, which lines extend perpendicularly to each other.

Such a method is advantageous, in particular, if almost the entire side rather than just an annular area, of the information carrier is to be provided with print. In this method, the label information is simply broken down into lines in the same way as for a conventional paper printer. This method has the advantage that the programs already available for paper printers to prepare information for processing by a printer can also be used for printing on disc-shaped information carriers.

A further embodiment of the invention is characterized in that the printer is an ink-jet printer. Ink-jet printers are particularly suitable due to the non-contact nature of the process.

Another possible embodiment is characterized in that, for each printing cycle, a laser-sensitive exposure cylinder is illuminated by a laser in conformity with a computer graphic program and the exposed areas are wetted by an ink-supply means, the ink being transferred to a printing cylinder to transfer the printing information to one information carrier at a time, which information carrier is supplied by means of a transport device. This method may result in prints of high quality.

The invention also relates to an apparatus for carrying out the method of the invention. That apparatus is characterized in that it includes an exposure cylinder which can be illuminated by a laser and which has an associated ink-supply means, and a printing cylinder which cooperates with the exposure cylinder and which is arranged in the direct proximity of a transport device for the Compact Discs to be processed.

In many cases, to protect the print on the information carrier, an embodiment of the method of the invention is the information carrier is characterized in that after printing the information carrier is provided with a transparent protective coating.

In a further embodiment of the invention, the label information of each individual information carrier produced by means of the inventive method includes an individual marking.

This method of the invention offers the important possibility of marking the individual disc-shaped information carriers of one series, having the same information content, each with an individual marking. This is, for example, of interest in the case of CD-ROM discs. Individual marking enables a specific copy to be identified, to ascertain whether the user of said copy is the legitimate owner. This possibility is of special importance in view of copyright protection. Such an individual marking may also be important for information carriers provided with music, because it enables so-called "bootleg" discs to be traced Boot leg" discs are ones having information content which have been manufactured illegally by third parties.

An advantageous method of the invention may be characterized in that a plurality of printing methods can be used, and the label information printed by at least one of these methods is produced by means of a data-processing system. This makes it possible to print the basic information (trade mark, manufacturer, etc.) using a well-known tampon- or screen-printing method, whereas the additional, variable information (title, composer, number, individual characterization, etc.) is printed with an additional printer which is controlled by a data-processing system.

The method of the invention can be combined without too many problems with the prior-art screen-printing or tampon-printing methods. By means of these prior-art methods, it is, for example easy to produce a background on which further detailed information, which may differ for different series, can be printed by means of the method in accordance with the invention.

BRIEF DESCRIPTION OF THE DRAWINGS

Embodiments of apparatus for carrying out the inventive method will now be described in more detail, by way of example, with reference to the drawings, in which.

DESCRIPTION OF THE PREFERRED EMBODIMENTS

Figures 1, 2:
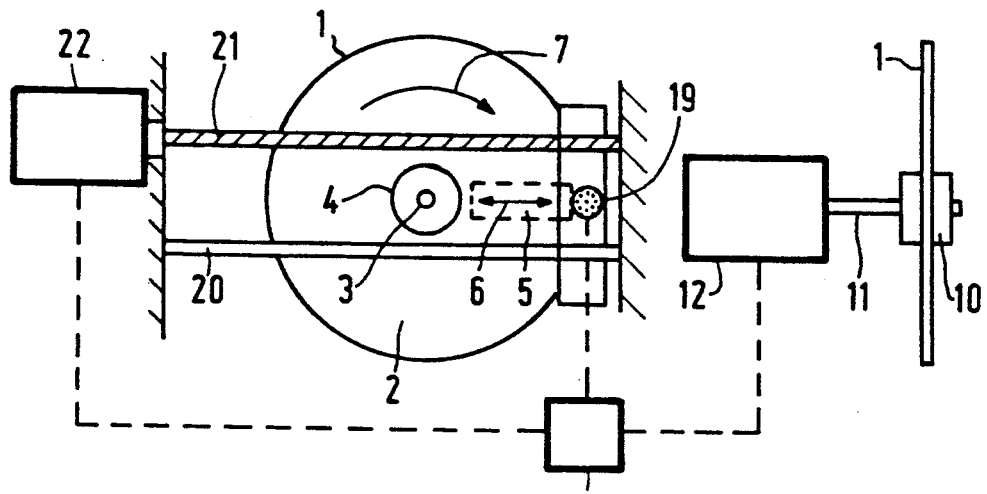
FIG. 1 is a diagrammatic front view of an apparatus for printing on disc-shaped information carriers, in which apparatus the carriers are rotated for the purpose of printing.
FIG. 2 is a side view of the apparatus shown in FIG. 1.

FIG. 1 is a diagrammatic front view of a first printing apparatus for disc-shaped information carriers. A disc-shaped information carrier 1, for example, a Compact Disc, is to be provided with print in an annular area 2. In its center the disc-shaped information carrier 1 has a centre hole 3, with which the annular area 2 is concentric. An area 4 may be provided, in a customary manner, with, for example, a marking corresponding to the catalog number of the information carrier or the like. Above the annular area 2 of the disc-shaped information carrier 1, an ink-jet printer with a printer head 19 is arranged. The reference numeral 5 diagrammatically shows a printing area to a highly enlarged scale. The printer head 19 is movable in the direction indicated by an arrow 6 which extends radially over the annular area 2. The printer head 19 is guided along a guide member 20 and is driven by a stepper motor 22 by a drive member 21 (lead screw).

For printing on the annular area 2, a line which extends radially in the annular area 2 is printed in such a way that the ink-jet printer prints a radial line, starting at the inner edge of the annular area 2 up to the outer edge of the area, the printer head 19 moving in the printing area 5 as indicated by the arrow 6. Subsequently, the disc-shaped information carrier 1 is rotated through a given angle. This rotation may be, for example, in the clockwise direction, as is indicated by the arrow 7 in FIG. 1. After this rotation of the information carrier 1, another radial line is printed by means of the ink-jet printer 5. This process is continued until the information carrier 1 has made one full revolution and the entire annular area 2 has thus been provided with print.

Alternatively, it is possible to rotate information carrier 1 continuously and to print the label information in concentric or spiral tracks. Instead of a printer head 19, a printer head array may be used, so that a plurality of tracks may be printed simultaneously. The radial travel of the array will diminish accordingly.

FIG. 2 is a diagrammatic side view of the apparatus shown in FIG. 1, the ink-jet printer not being shown. The disc-shaped information carrier 1 is clamped in a holder 10. This holder 10 is connected to a stepper motor 12 by a shaft 11. The stepper motor 12 serves to rotate the disc-shaped information carrier through a specific angle after one line has been printed by means of the ink-jet printer. Suitably, the mechanical movements of both the stepper motors 12 and 22 and the printer head 19 of the ink-jet printer are controlled by means of an appropriate printing program in a data-processing system 23, which also supplies the label information.

Figures 3, 4:
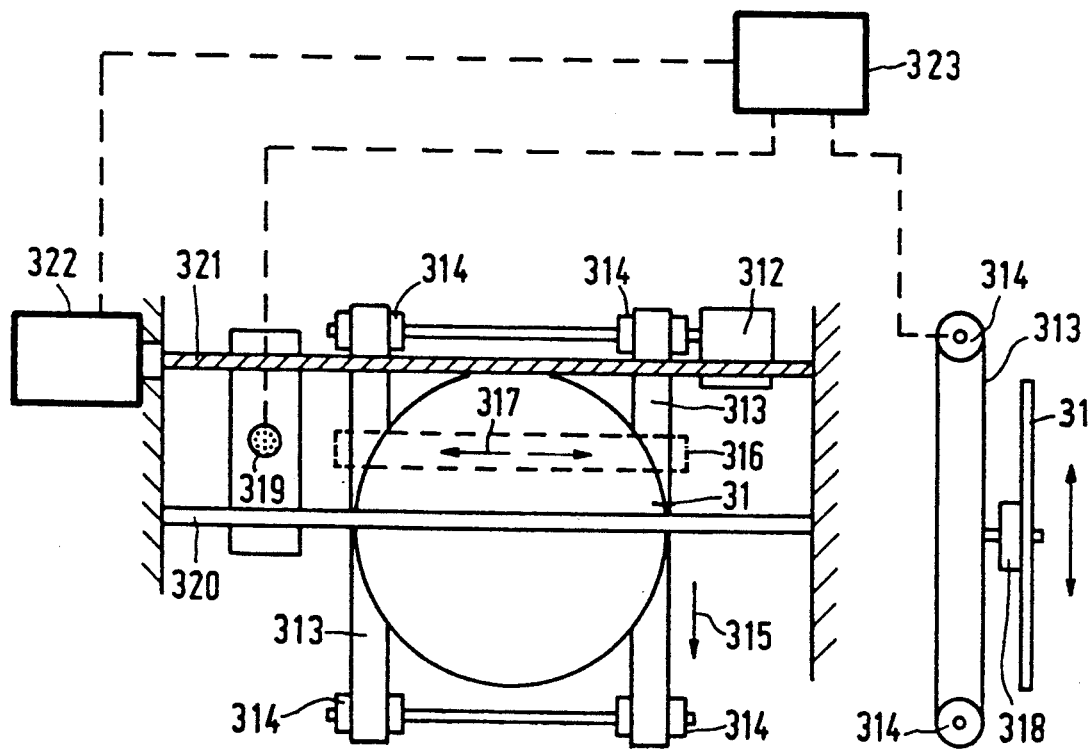
FIG. 3 is a diagrammatic front view of another apparatus for printing on disc-shaped information carriers.
FIG. 4 is a side view of the apparatus shown in FIG. 3.

FIG. 3 diagrammatically shows another embodiment of an apparatus for carrying out the printing method for disc-shaped information carriers. In this apparatus, shown in FIG. 3, the disc-shaped information carrier 31 to be provided with print is moved along a straight line and is not rotated. In a manner not shown in FIG. 4 the information carrier 31 is connected to two conveyor belts 313 which are each passed over reversing means 314 at opposite ends. In the plane of the drawing, the direction of movement obtained by means of the apparatus extends from the top to the bottom, as is indicated by the arrow 315 in FIG. 3.

An ink-jet printer comprising a printer head 319 is arranged above the disc-shaped information carrier 31. This printer head 319 can move over the entire diameter of the disc-shaped information carrier 31 along a straight line 317 which extends perpendicularly to the direction of movement 315 of the disc-shaped information carrier 31. The reference numeral 316 diagrammatically represents the printing area to a highly enlarged scale.

In the same way as in the apparatus shown in FIG. 1 and 2, both the movement of the printer head 319 and that of the disc-shaped information carrier 31 are suitably controlled by means of the same data-processing system 323 which supplies the printing program for the ink-jet printer.

The information carrier 31 (or 1 in FIG. 1) may be provided with basic label information before or after the label information using the method of the invention is printed. The basic information may be printed using a conventional printing method. The basic information may be regarded as invariable information, whereas the additional information may be regarded as variable in character.

FIG. 4 is a diagrammatic side view of the apparatus shown in FIG. 3. The disc-shaped information carrier 31 is fixed to a holder 318 connected to the two conveyor belts 313. The conveyor belts 313 are passed over a reversing means 314 at the top and at the bottom. The movement of the information carrier 31 by means of the conveyor belts 313 and the reversing means 314 may be provided, for example, by a stepper motor 312, which is mounted on one of the shafts of the reversing means 314.

Thus, printing on the disc-shaped information carrier 31 by means of the apparatus shown diagrammatically in FIGS. 3 and 4 is effected in the same way as printing on a sheet of paper by means of an appropriate printer. For printing one line, the printer head 19 of the ink-jet printer is moved along the straight line 317. After this line has been printed, the disc-shaped information carrier 31 is advanced by one line, for example, along the straight line 315. Subsequently, the next line is printed, etc. In this way the disc-shaped information carrier is provided with contiguous parallel printed lines, if desired over the entire area of one side.

Figure 5:
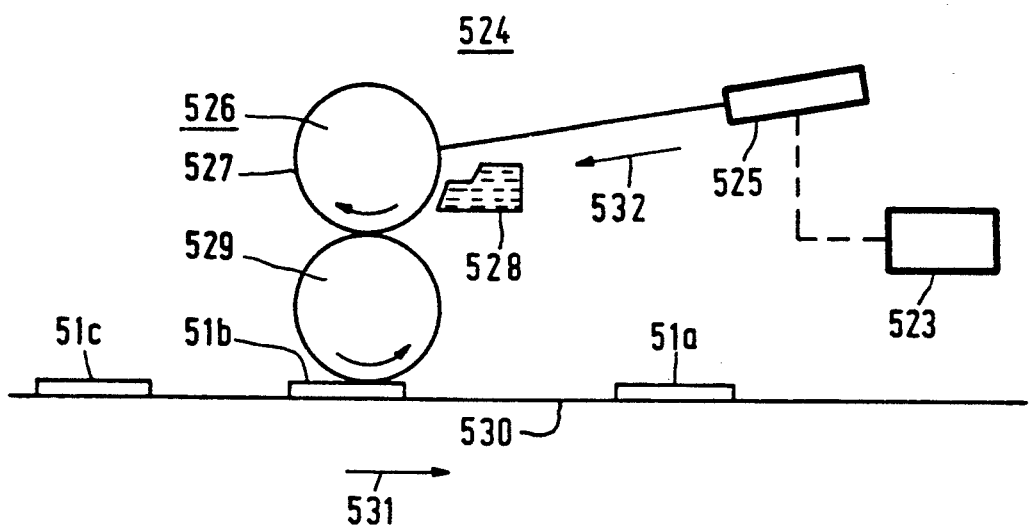
FIG. 5 shows an apparatus comprising a laser printer.

FIG. 5 diagrammatically shows a printing apparatus for disc-shaped information carriers 51, which apparatus comprises a laser printer 524. This printer comprises a laser 525 which illuminates an exposure cylinder 526 provided with an electrically changeable layer 527 (for example selenium). The exposure cylinder 526, which has an associated ink supply means 528, cooperates with a printing cylinder 529. A transport device 530 provides the transport of the information carrier 51 to be processed in the direction 531. The data-processing system 523 supplies the label information and drives the laser 525. For each information carrier or CD 51 to be provided with print, a separate printing cycle is carried out. In FIG. 5, the printing cycle for the disc 51a has been completed (see FIG. 6), the printing cycle is in progress for the disc 51b, and the printing cycle has not yet started for the disc 51c.

The cylinder 56 is illuminated in conformity with the computer graphics (label information). The ink from the supply means 528 is applied to the printing cylinder 529 and, thus, to the CD 51 to be provided with print. After printing, the CD 51a is provided with a transparent scratch-resistant coating.

Figure 6:
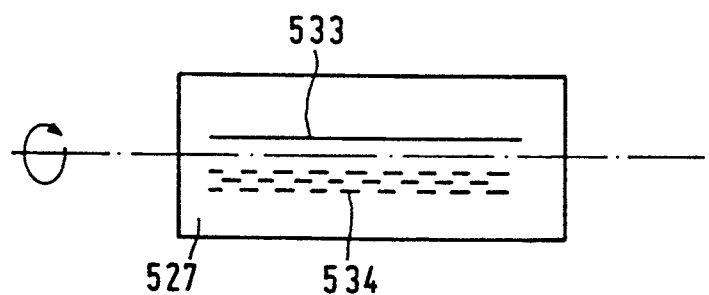
FIGS. 6 and 7 show parts of the apparatus of FIG. 5.

FIG. 6 shows the exposure cylinder viewed in the direction 532. In this Figure, 533 indicates the exposure range of the laser 525, and the exposed area bears the numeral 534.

Figure 7:
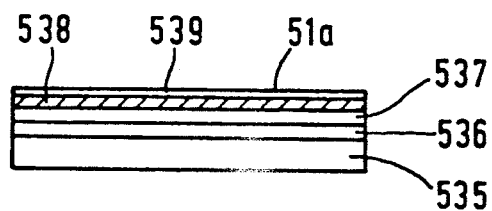

FIG. 7 shows a Compact Disc 51a. The actual (i.e., optically readable) information on the CD is situated between a polycarbonate layer 535 metallization layer 536. The numeral 537 indicates a protective coating, the numeral 538 is the printed layer applied (i.e., the layer in which the label information is printed) in accordance with the invention, and the numeral 539 indicates a transparent scratch-resistant coating, for example, a UV curable material.

The use of a laser printer is not expensive and provides a high printing quality.

What is claimed is:

1. A method for providing a disc-shaped information carrier with label information in the form of graphics and/or characters, said information carrier having at least a first layer for receiving the label information and a second layer in which optically readable information is included, the method comprising:

preparing the label information by means of a data processing system;

transferring the label information from said data processing system to a printer for processing, said printer having a printing head for printing; and printing the label information directly on at least a part of said first layer;

wherein during printing, said printing head is moved radially relative to said information carrier and said information carrier is rotated.

2. A method for providing a disc-shaped information carrier with label information in the form of graphics and/or characters, said information carrier having a first layer for receiving the label information and a second layer in which optical readable information is included, the method comprising:

preparing the label information by means of a data processing system;

transferring the label information from said data processing system to a printer for processing, said printer having a printing head for printing; and printing the label information directly on at least a part of said first layer;

wherein during printing, said printing head and said information carrier are moved relative to each other on lines which extend perpendicularly to each other.

3. The method as claimed in either claim 1 or 2, wherein said printer is an ink jet printer.

4. An information carrier manufactured by means of the method claimed in claim 3, wherein said information carrier is provided with an individual marking.

5. An information carrier manufactured by means of the method claimed in claim 3, wherein said first layer is covered by a transparent protective coating after the label information is printed thereon.

6. A method for providing a disc-shaped information carrier with label information in the form of graphics and/or characters, said information carrier having at least a first layer for receiving the label information and a second layer in which optically readable information is included, the method comprising:

preparing the label information by means of a data processing system;

transferring the label information from said data processing system to a printer for processing; and printing the label information directly on at least a part of said first layer;

wherein in printing the label information on the record carrier, a laser-sensitive exposure cylinder is illuminated by a laser and exposed areas are wetted by an ink-supply means in conformity with the label information, ink is transferred from said exposure cylinder to a printing cylinder in conformity with the label information, and said ink is transferred from said printing cylinder to said information carrier.

7. The method as claimed in claim 6, wherein said information carrier is supplied by a transport means to said printer.

8. An information carrier manufactured by means of the method claimed in claim 1, 2 or 6, wherein said information carrier is provided with an individual marking.

9. An information carrier manufactured by means of the method claimed in claim 1, 2 or 6, wherein said first layer is covered by a transparent protective coating after the label information is printed thereon.

10. An apparatus for providing a disc-shaped information carrier with label information in the form of graphics and/or characters, said information carrier having at least a first layer for receiving the label information and a second layer in which optically readable information is included, the apparatus comprising:

a printer having a printing head for printing the label information directly on at least a part of said first layer; and a data processing system for preparing and transferring the label information to said printer for processing;

wherein during printing, said printing head is moved radially relative to said information carrier and said information carrier is rotated.

11. An apparatus for providing a disc-shaped information carrier with label information in the form of graphics and/or characters, said information carrier having at least a first layer for receiving the label information and a second layer in which optically readable information is included, said apparatus comprising:

a printer having a printing head for printing the label information directly on at least a part of said first layer; and a data processing system for preparing and transferring the label information to said printer for processing;

wherein during printing, said printing head and said information carrier are moved relative to each other on lines which extend perpendicularly to each other.

12. The apparatus as claimed in either claim 10 or 11, wherein said printer is an ink jet printer.

13. An apparatus for providing a disc-shaped information carrier with label information in the form of graphics and/or characters, said information carrier having at least a first layer for receiving the label information and a second layer in which optically readable information is included, the apparatus comprising:

a printer for printing the label information on at least a part of said first layer said printer including a laser, a laser sensitive exposure cylinder, an ink supply means and a printing cylinder; and a data processing system for preparing and transferring the label information to said printer for processing;

wherein in printing the label information on the record carrier, said laser sensitive exposure cylinder is illuminated by said laser and exposed areas are wetted by said ink supply means in conformity with the label information, said laser sensitive exposure cylinder transfers ink to said print cylinder in conformity with the label information and said print cylinder transfers said ink to said information carrier.

14. The apparatus as claimed in claim 13, further comprising a transport means for supplying said information carrier to said printer.

15. The apparatus as claimed in claim 10, 11 or 13, wherein the apparatus is adapted to provide said information carrier with an individual marking.

16. The method as claimed in claim 1, 2 or 6, further comprising covering said first layer with a transparent protective coating after the label information is printed thereon.

* * * * *